United States Patent
Drewry

[11] 3,813,632
[45] May 28, 1974

[54] ADAPTER FOR A VEHICLE HAVING A BUILT-IN DIAGNOSTIC SYSTEM

[75] Inventor: Hugh S. Drewry, Wauwatosa, Wis.

[73] Assignee: Allis-Chalmers Corporation, Milwaukee, Wis.

[22] Filed: Dec. 4, 1972

[21] Appl. No.: 311,888

[52] U.S. Cl. ............... 339/10, 339/18 P, 339/32 R, 339/154 A, 339/186 R
[51] Int. Cl. ...................... H01r 33/00, H01r 13/64
[58] Field of Search ........ 339/32, 33, 113 R, 113 B, 339/150 B, 151 B, 152, 154, 156, 157, 10, 18 P, 126 R, 184, 186

[56] References Cited
UNITED STATES PATENTS
1,281,288  10/1918  Carley ..................... 339/113 B X
3,412,368  11/1968  Ashbridge et al. ............... 339/126 R FOREIGN PATENTS OR APPLICATIONS
924,968    3/1955   Germany ........................ 339/10
1,294,886  4/1962   France ........................ 339/32 M
345,492    3/1931   Great Britain ................ 339/184 M
1,346,616  11/1963  France ........................ 339/33

*Primary Examiner*—Bobby R. Gay
*Assistant Examiner*—Lawrence J. Staab
*Attorney, Agent, or Firm*—John P. Hines

[57] ABSTRACT

A family of adapters for a vehicle having a built-in diagnostic system utilizing a multi-wire electrical cable providing a plurality of connections to the operating parts of the vehicle. The cable terminates in a connector located in an accessible position on the vehicle to which the diagnostic machine is connected. Each adapter is provided with special elements to engage only that portion of the connector which is electrically connected to the particular operating parts of the vehicle to be tested. The adapter is provided with exposed conventional terminals constructed and arranged to permit connection to a conventional test or repair instrument for the particular operating part of the vehicle.

4 Claims, 2 Drawing Figures

PATENTED JUN 28 1974   3,813,632

ADAPTER FOR A VEHICLE HAVING A BUILT-IN DIAGNOSTIC SYSTEM

This invention pertains in general to vehicles having built-in diagnostic systems and more particularly to an adapter which will permit utilization of the diagnostic system by conventional automotive equipment.

As the complexity of automobiles increases, automatic or computer like equipment is being used to diagnose faulty operation of the vehicles. Certain automobiles now being manufactured have a system built into the automobile which provides electrical connection to quite a large number of different operating parts and sensors of the vehicle. These electrical connections terminate in a connector located at an accessible position on the vehicle. Periodically the vehicle is taken to a repair station where a diagnostic machine is plugged into the connector and a large number of different tests are automatically conducted by the machine. This new diagnostic arrangement is quite an impressive, time-saving and reliable means of maintaining vehicles in proper operating condition.

However, at least for some time there will at times be a need to diagnose and repair vehicle malfunctions with the older, more conventional equipment. It would, therefore, be desirable to be able to utilize the built-in diagnostic system in the automobile with the older, more conventional test and repair equipment.

It is, therefore, the intention and general object of this invention to provide an adapter which will permit the utilization of the built-in diagnostic systems in vehicles with the conventional repair and test equipment.

A further object of the subject invention is to provide an adapter of the hereinbefore described type with contacts which will engage only predetermined parts of the diagnostic system to permit conventional test and repair equipment to be attached and electrically connected to a particular vehicle part.

A more specific object of the subject invention is to provide an adapter of the hereinbefore described type with terminals to engage the diagnostic system connector to provide electrical connection to the vehicle battery and which connector includes exposed protuberances for connection to a conventional battery charger or tester.

These and other objects of the subject invention will become more fully apparent as the following description is read in light of the attached drawing wherein.

Figure 1:
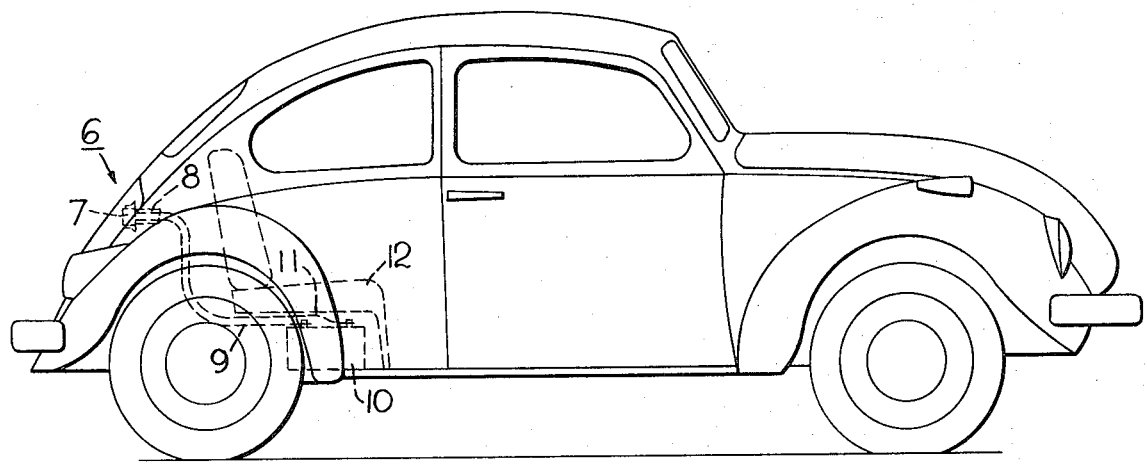
FIG. 1 shows a side elevation of a vehicle having a diagnostic system.

The automobile shown herein for purposes of illustration has a rear engine compartment generally designated 6. The diagnostic system includes a connector 7 supported in the engine compartment in an accessible location. A multi-wired cable 8 extends from the connector and includes a plurality of wires connected to a number of different operating parts of the vehicle. As an example, wires 9 and 11 are connected to the conventional automotive battery 10 located beneath the rear seat 12 in this particular automobile.

Figure 2:
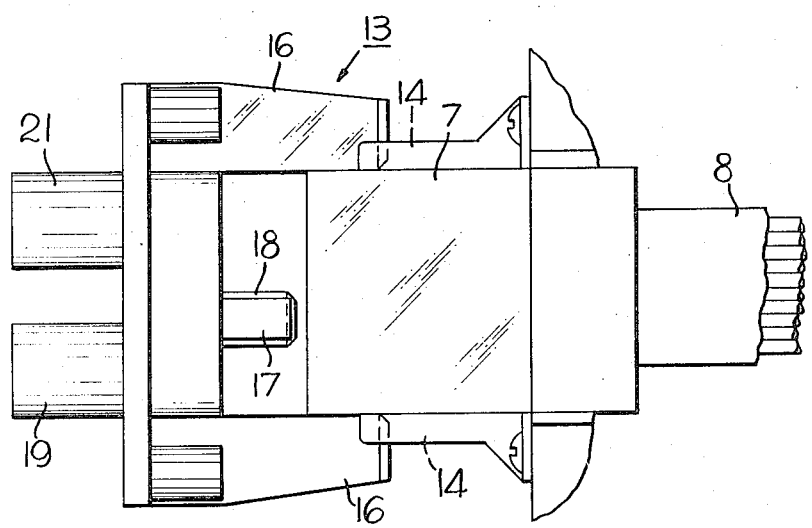
FIG. 2 shows a particular type of adapter constructed in accordance with the invention.

An adapter shown more particularly in FIG. 2 generally designated 13 is composed of a body constructed of an electrically insulating material. As herein shown for purposes of illustration, the connector 7 has a pair of grooves 14 formed on the opposite sides thereof. These grooves are spaced to receive side walls 16 of the adapter 13. One side wall and slide are of a different width so that the adapter can only be inserted in a single manner. This insures proper electrical polarity between the adapter and the connector.

In the particular adapter shown herein for purposes of illustration contacts 17 and 18 engage the connector 7 to provide an electrical connection with the wires 9 and 11 to the battery 10. This adapter 13 is provided with a pair of spaced terminals 19 and 21 which are electrically isolated from one another and are electrically connected to the contacts 17 and 18 respectively.

In this manner it can be seen that if it is desired to either test or recharge the battery 10 the adapter 13 is attached to the connector 7. Charging cables are then attached to the terminals 19 and 21, and the battery can be recharged. Additionally, it can be seen that the adapter 13 could be provided with contracts which would engage other operating portions of the car through the connector 7 such as the engine distributor. A conventional timing light or dwell meter could then be attached to the adapter to properly time the engine.

The embodiments of the invention in which an exclusive property or privilege is claimed are defined as follows:

1. An adapter constructed of an electrically insulating material for a vehicle having a diagnostic system including a multi-wire electrical cable terminating in an electrical connector with a plurality of terminal end contacts electrically connected to different operating parts of the vehicle, said adapter comprising:

contacts engaging less than all of said connector contacts providing electrical connection with only a single predetermined operating part of the vehicle; and a pair of terminals electrically connected to said adapter contacts spaced from one another and protruding from said adapter to permit electrical connection with conventional equipment to provide electrical contact with said single predetermined operating part of the vehicle.

2. An adapter constructed of an electrically insulating material for a vehicle having a rechargeable battery and a diagnostic system including a multi-wire electrical cable terminating in an electrical connector with a plurality of terminal end contacts electrically connected to different operating parts of the vehicle, including contacts electrically connected to said battery electrodes, said adapter comprising:

a pair of contacts engaging only said connector contacts electrically connected to said battery electrodes; and a pair of terminals electrically connected to said adapter contacts spaced from one another and protruding from said adapter to permit connection to a source of electrical energy for energizing said battery.

3. The adapter set forth in claim 2 wherein each of said terminals is physically identified to correspond to a particular battery electrode, and means are provided on said adapter to permit connection thereof to said connector in only one position to insure that the properly identified terminal is electrically connected to the corresponding battery electrode.

4. The adapter set forth in claim 2 wherein the terminal ends of said terminals are adapted to be engaged by conventional automotive battery jumper cables.

* * * * *